United States Patent [19]

Aznar et al.

[11] Patent Number: 5,238,076
[45] Date of Patent: Aug. 24, 1993

[54] ELECTRIC POWER STEERING FOR PARKING

[75] Inventors: Fernando Aznar, Rueil-Malmaison; Pascal Brousse, Les Mureaux; Philippe Saint-Martin, Houilles; Francois Tonnerieux, Antony, all of France

[73] Assignee: Regie National Des Usines Renault, Boulogne-Billancourt, France

[21] Appl. No.: 765,520

[22] Filed: Sep. 25, 1991

[30] Foreign Application Priority Data

Sep. 25, 1990 [FR] France .................. 90-11785

[51] Int. Cl.⁵ .............................................. B62D 5/04
[52] U.S. Cl. ............................................... 180/79.1
[58] Field of Search ................... 180/79.1, 142; 364/424.05, 424.01; 318/432, 434, 646

[56] References Cited

U.S. PATENT DOCUMENTS

| | | | |
|---|---|---|---|
| 4,660,671 | 4/1987 | Behr et al. | 142/180 |
| 4,753,310 | 6/1988 | Hashimoto | 180/79.1 |
| 4,754,829 | 7/1988 | Shimizu | 180/79.1 |
| 4,794,210 | 12/1988 | Hammerle et al. | 180/79.1 |
| 4,798,253 | 1/1989 | Naito | 180/79.1 |
| 4,825,972 | 5/1989 | Shimizu | 180/79.1 |
| 4,830,137 | 5/1989 | Tatemoto et al. | 180/79.1 |
| 4,947,949 | 8/1990 | Morishita et al. | 180/79.1 |
| 4,957,181 | 9/1990 | Oshita et al. | 180/79.1 |
| 5,097,918 | 3/1992 | Daido et al. | 180/79.1 |

FOREIGN PATENT DOCUMENTS

| | | |
|---|---|---|
| 0238349 | 3/1987 | European Pat. Off. . |
| 0237178 | 6/1987 | European Pat. Off. . |
| 0249488 | 12/1987 | European Pat. Off. . |
| 2758308 | 12/1977 | Fed. Rep. of Germany . |
| 2577878 | 2/1986 | France . |
| 2596722 | 2/1987 | France . |
| 2614985 | 5/1987 | France . |
| 2130537 | 10/1983 | United Kingdom . |
| 2164303 | 3/1986 | United Kingdom . |

*Primary Examiner*—David M. Mitchell
*Assistant Examiner*—Florian Zeender
*Attorney, Agent, or Firm*—Oblon, Spivak, McClelland, Maier & Neustadt

[57] ABSTRACT

Electric power steering for parking comprising a dc electric booster motor (1) provided with a clutch, a reduction gear (2), a steering wheel torque sensor (3), a vehicle speed sensor and an electronic circuit for control of the motor, characterized, on the one hand, in that the torque sensor delivers all-or-nothing signals, and, on the other hand, in that the boost ratio is proportional to the time during which the torque signal is present when the vehicle travels below a preset speed limit and is canceled when the vehicle exceeds this speed.

19 Claims, 4 Drawing Sheets

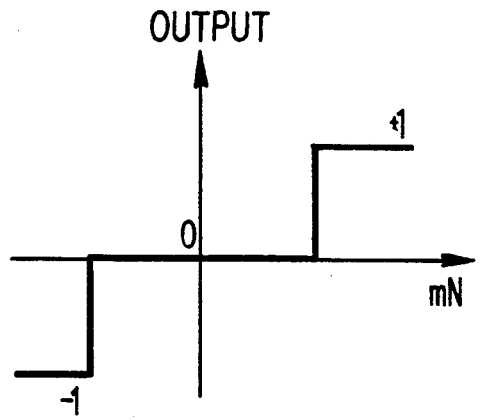
FIG. 2a
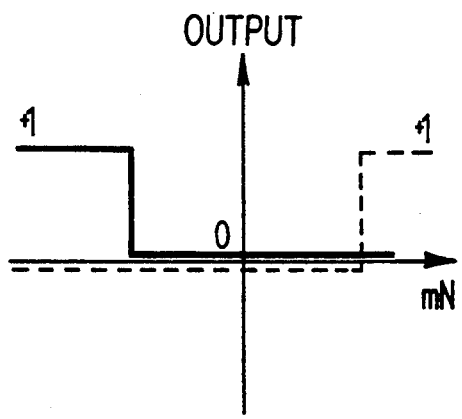
FIG. 2b
FIG. 3
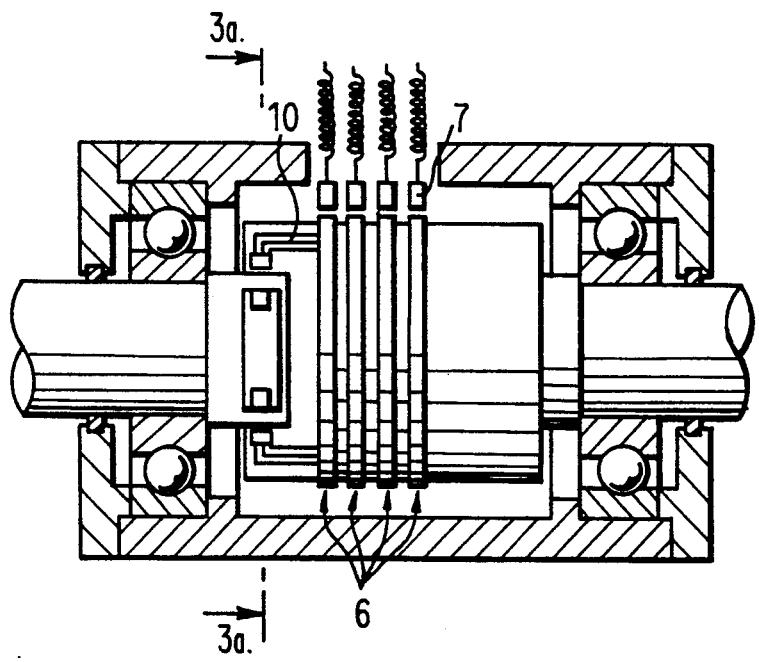
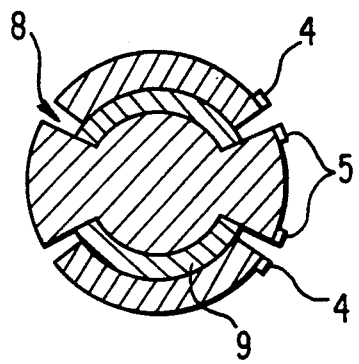
FIG. 3a

ELECTRIC POWER STEERING FOR PARKING

BACKGROUND OF THE INVENTION

1. Field of the Invention

This invention relates to so-called power steering "for parking." While the standard power steering systems provide a boost torque to the steering wheel torque exerted by the driver on the steering column, whatever the speed of the vehicle may be, the so-called power steering systems for parking exert their boost only at reduced speeds.

The principle of the boost "for parking" is already applied on some hydraulic and electric power steering systems. Its application to electric power steering is illustrated by publication FR 2,248,702. According to this publication, the driving unit of the booster system is put into operation by a circuit depending on the speed of the vehicle, the driving being cut off when the vehicle exceeds a certain speed.

Many electric power steering systems, such as the one described in publication FR 2,573,380, comprise an input shaft, an output shaft connected mechanically to the input shaft by a torsion bar, a torque sensor detecting the torque exerted on the torsion bar, and a dc motor exerting a boost torque on the output shaft, in response to signals from the torque sensor.

According to publication FR 2,573,380, the control signal of the motor can advantageously consist of a rotor voltage having a value proportional to the amplitude of the steering wheel torque imposed on the input shaft. A torque sensor particularly intended for electric power steering is described in publication FR 2,630,699. This sensor measures the relative torque existing between a primary steering shaft and a secondary steering shaft, and emits corresponding signals to a servomotor driving a secondary shaft as a function of the signals. It is also known to add to the performance by making the boost ratio vary as a function of the speed of the vehicle. This is applied in the device which is the object of publication FR 2,248,702, according to which the electric booster motor meets the variable conditions of movement of the vehicle, transmitted in particular by a speed sensor.

SUMMARY OF THE INVENTION

The invention aims at producing electric power steering for parking simplified relative to the known devices, while offering a very great driving comfort to the user.

According to an embodiment of the invention, the electric power steering for parking comprises a dc electric booster motor, a clutch, a reduction gear, a steering wheel torque sensor, a vehicle speed sensor and an electronic circuit for control of the motor. This steering is characterized, on the one hand, in that the torque sensor delivers all-or-nothing signals, and, on the other hand, in that the boost ratio is proportional to the time during which the torque signal is present when the vehicle travels below a preset speed limit and is canceled when the vehicle exceeds this speed.

According to an embodiment of the invention, the torque sensor delivers two different output signals according to the direction of the steering wheel torque exerted by the driver.

According to an embodiment of the invention, the torque sensor comprises two contacts, an elastic element of angular deformation amplification in an elastomer and at least two slip rings combined with brushes.

According to an embodiment of the invention, the contacts of the torque sensor are mechanical.

According to an embodiment of the invention, the contacts of the torque sensor are reed contacts actuated by magnets.

According to an embodiment of the invention, the torque sensor comprises a third slip ring.

According to an embodiment of the invention, the sensor comprises four slip rings, and the contacts are Hall-effect probes.

According to an embodiment of the invention, the direction of the booster motor torque is determined by two changeover contact relays switching at very low current or at zero current, which select the direction of the feed current of the motor.

According to an embodiment of the invention, the intensity of the feed current of the motor is determined by the integration over time of signals emitted by the torque sensor.

According to an embodiment of the invention, below the speed limit, the boost level is proportional to the intensity of the feed current of the motor, which increases along a set slope $\theta_1$ while the sensor provides torque signals.

According to an embodiment of the invention, the boost level decreases along a slope $\theta_2$, so-called steering wheel release, when the sensor stops emitting torque signals.

According to an embodiment of the invention, the boost level decreases along a slope $\theta_3$ that is smaller than slope $\theta_2$ for steering wheel release, when the vehicle exceeds the speed limit during steering.

According to an embodiment of the invention, the decrease continues along slope $\theta_3$ until the boost torque disappears, while the sensor emits torque signals.

According to an embodiment of the invention, the decrease of the boost level continues along slope $\theta_2$ when the sensor stops emitting torque signals after the vehicle has exceeded the speed limit.

According to an embodiment of the invention, the electronic control circuit of the booster motor comprises a control unit of the relays receiving the signals from the torque sensor and a zero motor current signal, a clutch control unit, an integrator receiving the signals of the torque sensor, the shaped speed signal and the safety signal of the motor, and an element for measuring the motor current.

According to an embodiment of the invention, the electronic control circuit of the booster motor comprises an analog-to-digital converter assuring the transformation of the analog signal provided by the integrator to a square-wave voltage of variable cyclic ratio, a unit for shaping the vehicle speed signal, and a dual current comparator.

According to an embodiment of the invention, the electronic control circuit comprises two relays and a power semiconductor assuring the square-wave modulation of variable cyclic ratio of the supply voltage of the motor.

According to an embodiment of the invention, the element for measuring the motor current delivers a signal which is compared in a two-level unit to generate zero current and supercurrent data.

According to an embodiment of the invention, the electronic control circuit of the motor comprises a system for protecting the motor assuring the cutoff of the supply of the motor, in the face of a supercurrent, and the restoration of the boost when the reversal of direction of the steering wheel torque relative to that which caused the supercurrent is detected.

BRIEF DESCRIPTION OF THE DRAWING

Other characteristics and advantages of the invention will come out from reading the following description of a particular embodiment of the invention in connection with the accompanying drawings in which:

FIG. 2a shows the shape of the signal provided by the proposed torque sensor, using only one three-level output, FIG. 2b shows the shape of the signals provided by the proposed torque sensor using two outputs, at two levels, FIG. 3 is an embodiment of a torque sensor with an elastic torsion element, two outputs of the Hall probe type and four slip rings, FIG. 3a is a cross sectional view of FIG. 3 along line A—A'.

DETAILED DESCRIPTION OF THE DRAWING

Figure 1:
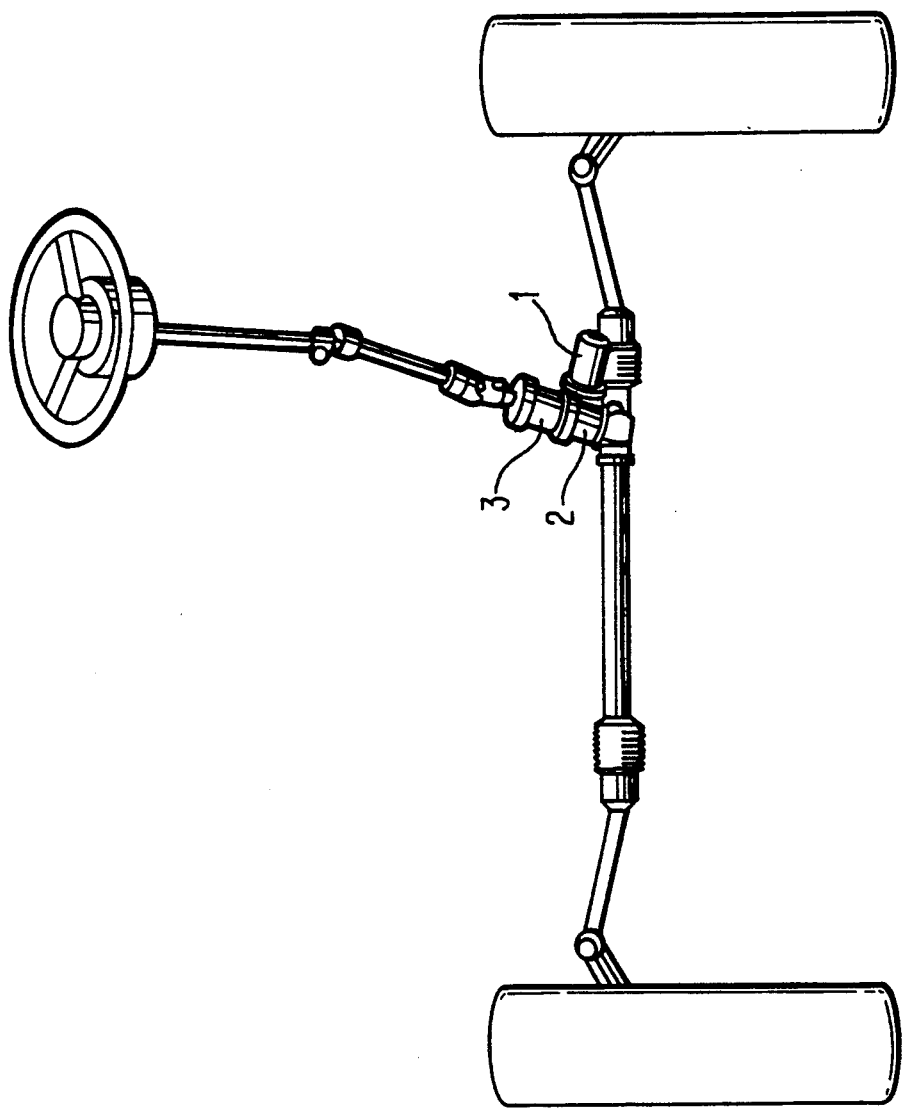
FIG. 1 locates the mechanical installation of the power steering for parking on the vehicle.

FIG. 1 locates the installation, on the steering column, of torque sensor (3) of booster motor (1) and reduction gear (2). Some elements, which play an important role in the embodiment of the invention, such as the clutch of the booster motor, the sensor of the speed of the vehicle or else the electronic control circuit of the motor, do not appear on this diagram for the sake of clarity.

Figure 4A:
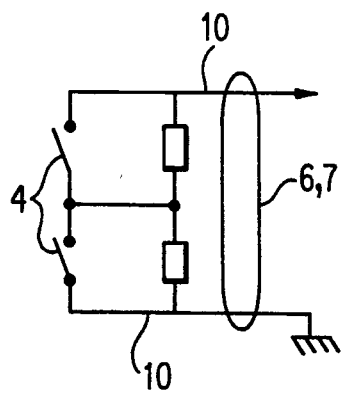
FIG. 4a is an electrical diagram of the proposed sensor with two slip rings, two mechanical contacts or reed contacts, and two resistors.
Figure 4B:
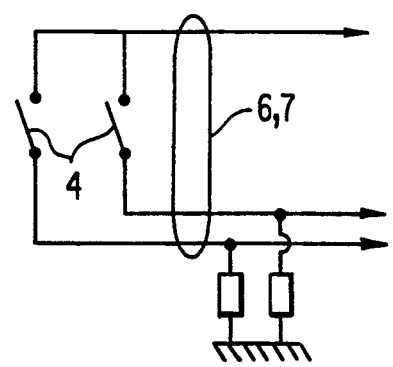
FIG. 4b is an electrical diagram of the proposed sensor with three slip rings, based on two mechanical or reed contacts.
Figure 4C:
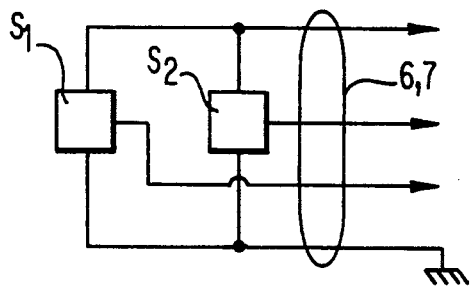
FIG. 4c is an electrical diagram of the proposed sensor with four slip rings, with two Hall probes.

The torque sensors usually mounted on the power steering columns evaluate the torque exerted on the steering shaft by the measurement of the angular deformation of a torsion bar. In response they emit a signal representing a linear function of the steering wheel torque. On the contrary, the torque sensor used in the invention delivers only all-or-nothing signals indicating the exceeding of a symmetrical torque threshold. This sensor can have only a single output: the signal then has three levels (FIG. 2a). It can also exhibit two outputs, the signal is then at two levels (FIG. 2b). The torque to be provided by the driver being equal to the reduced opposing torque of the existing boost torque, the symmetrical threshold corresponds to the maximum value of remaining torque to be provided by the driver, as long as the boost is not saturated. The fact of an all-or-nothing response being enough makes it possible to simplify greatly the production of sensor (3), the only constraints being the adjustment of the boost threshold and its symmetry. The use of brush slip rings (6) is made possible by the simplicity of the expected data of the system. The elastic element for angular deformation amplification (9) can advantageously be of elastomer. Contacts (4) can be produced in various ways. Mechanical contacts with or without resistors (FIG. 4a or 4b), reed contacts activated by magnets (5) (FIG. 4a or 4b) or else Hall-effect probes ($S_1$, $S_2$) (FIG. 4c) activated by magnets, will be adopted. The reed contacts and the mechanical contacts require two or three slip rings (6) since such contacts have a common electric point. The "Hall-effect probe" solution requires, on the other hand, one more slip ring for the supply. The electric connection between contacts (4) and slip rings (6) is achieved by wires (10).

The transmission of the force between the input shaft and the output shaft is performed by an elastic angular deformation element (9). However, it is necessary to be able to transmit torques greater than the measuring range. For this purpose, torque takeup bearings having an angular play (8) are used, making it possible to obtain, between the output shaft and the input shaft, a free angular movement up to a certain angle beyond which the bearings are in contact and link the two shafts completely.

Figure 6:
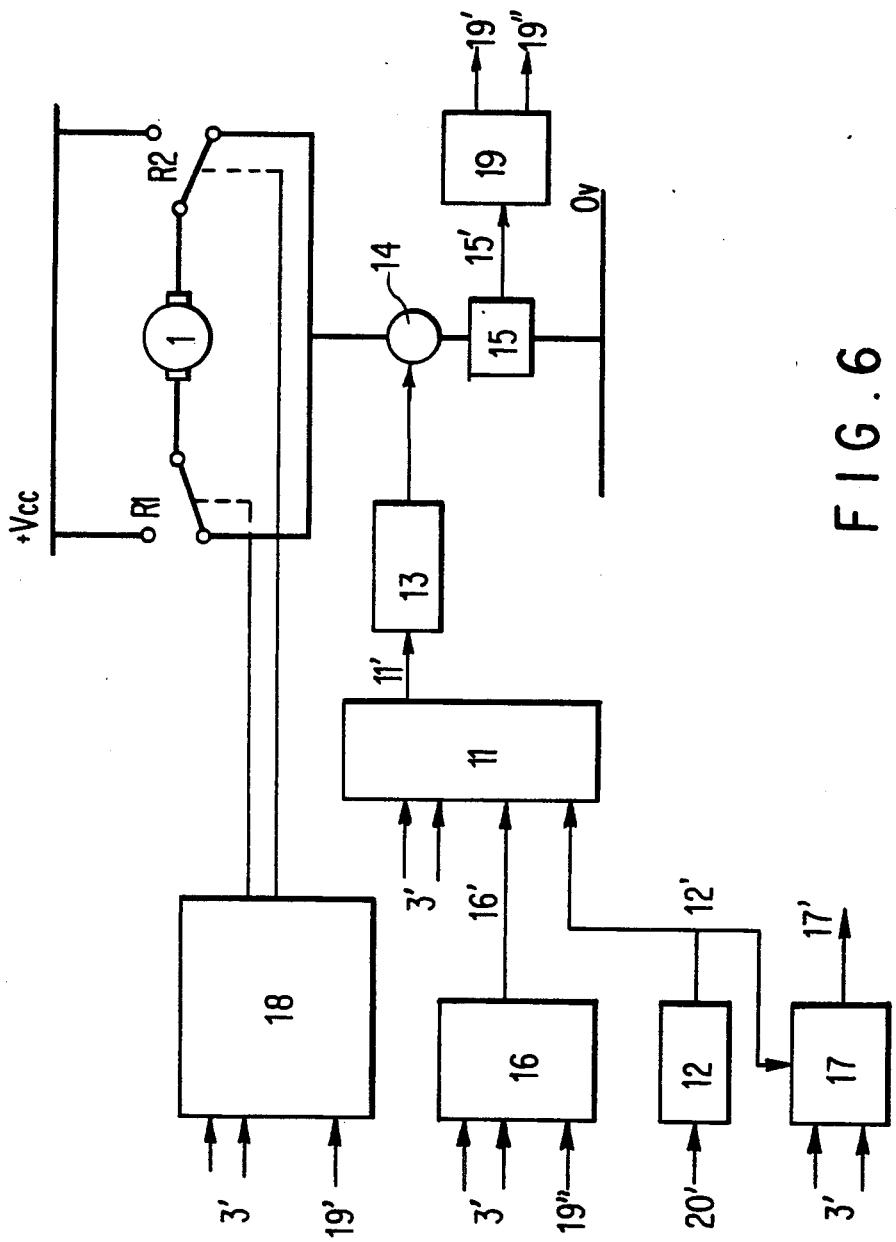
FIG. 6 is an embodiment of the electric control circuit the booster motor.

In any case, the output of torque sensor (3) is connected with the electronic control circuit represented in FIG. 6. This diagram shows that signals (3') of torque sensor (3) are introduced in a unit (18) assuring the control of two relays $R_1$ and $R_2$. These two relays control the direction of the supply of the dc booster motor (1), and therefore, the direction of the boost torque.

Signals (3') of torque sensor (3) are also transmitted to an integrator (11), to a clutch control unit (17), and to a unit for protection from an overload of motor (16). The speed signal of vehicle (20), once processed in a shaping unit (12), is transmitted to integrator (11) and to clutch control unit (17).

At the output of integrator (11), an analog-to-digital converter (13) is found. The latter transforms analog signal (11') coming from integrator (11) into a square-wave voltage of variable cyclic ratio. The latter controls a power semiconductor (14) in pulse width, to regulate the current in the motor. An element for measuring (15) the motor current delivers a signal (15') which is compared in a two-level unit (19) to generate zero current data (19') and supercurrent data (19"). Finally, the electronic circuit comprises a system for protecting the motor from supercurrents (16), receiving supercurrent data (19").

The direction of the boost torque is determined by two relays $R_1$ and $R_2$ which are changeover contact types. The control of the relays is also worked out from signals (3') of torque sensor (3) and the motor current. The switching of the relays is performed at very low current or at zero current, which assures the latter a long life.

Figure 5:
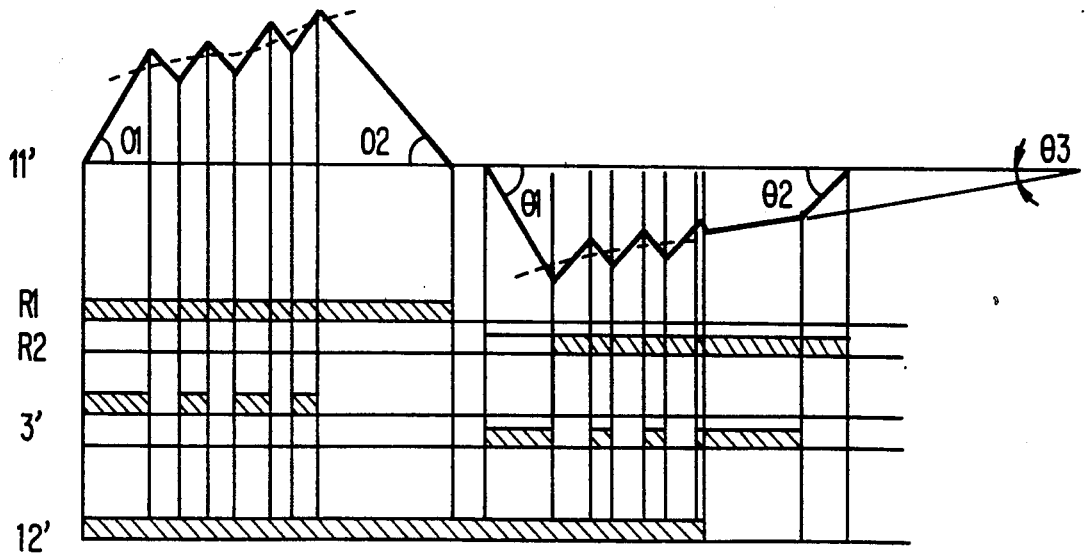
FIG. 5 represents the laws of increase and decrease of the boost as a function of the steering wheel torque and/or the speed of the vehicle.

When the vehicle travels at low speed, the boost ratio, which is proportional to the feed current of the motor, is determined by integration over time of the signal of the torque. This integration makes it possible to obtain a continuous boost from all-or-nothing signals. In response to signals (3') of torque sensor (3), the boost increases along a set slope $\theta_1$ (FIG. 5). When the steering wheel torque exerted by the driver decreases until reaching the "boost threshold," sensor (3) puts its output or outputs at zero. The boost level then decreases along set slope $\theta_2$, so-called steering wheel release.

When the vehicle exceeds the speed limit, the system is put out of operation. This means that the driver no longer uses boost for steering. Nevertheless, if the driver finds himself in a steering situation when he exceeds the speed limit, it is important, for his safety, that the boost torque does not disappear suddenly. For this purpose, the invention proposes a gradual decrease along a slope $\theta_3$, smaller than slope $\theta_2$ for "steering wheel release." The decrease then continues along this slope $\theta_3$ until the boost disappears, as long as the driver exerts a torque on the steering wheel. On the other hand, if the driver "releases the steering wheel," the decrease of the boost becomes again that of "releasing the steering wheel" and continues until zero, along slope $\theta_2$.

An extended steering can bring the steering rack to the end of travel, thus locking the motor and causing an unnecessary and dangerous heating. The protection of the motor by cutting off its supply in the face of a supercurrent is known. The electronic control circuit of the booster motor comprises a suitable protective system. When the boost has been suspended because of a supercurrent, the invention provides the restoration of the boost as soon as the reversal of direction of the steering wheel torque, relative to that which caused the supercurrent, is detected.

We claim:

1. Electric power steering for parking comprising:
   a dc electric booster motor provided with a clutch,
   a reduction gear,
   a steering wheel torque sensor,
   a vehicle speed sensor, and
   an electronic motor control circuit,
   wherein the torque sensor delivers all-or-nothing signals, and wherein the control circuit comprises means for producing a boost ratio proportional to the time during which the torque signal is present when the vehicle travels below a preset speed limit and for cancelling boost when the vehicle exceeds this speed.

2. Power steering according to claim 1, wherein the torque sensor delivers two different output signals according to the direction of the steering wheel torque exerted by the driver.

3. Power steering according to claim 1, wherein the torque sensor comprises two contacts, an elastic element for angular deformation amplification of elastomer, and at least two slip rings combined with brushes.

4. Power steering according to claim 3, wherein the contacts are mechanical.

5. Power steering according to claim 3, wherein the contacts are reed contacts actuated by magnets.

6. Power steering according to claims 4 or 5, wherein the torque sensor comprises a third slip ring.

7. Power steering according to claim 3, wherein the torque sensor comprises four slip rings and wherein the contacts are Hall-effect probes.

8. Power steering according to claim 1, wherein the direction of the booster motor torque is determined by two changeover contact relays $R_1$ and $R_2$ switching to very low current or to zero current, which select the direction of the feed current of the motor.

9. Power steering according to claim 1, wherein the intensity of the feed current is determined by the integration over time of signals emitted by a torque sensor.

10. Power steering according to claim 1, wherein, below the speed limit, the boost level is proportional to the intensity of the feed current, which increases along a set slope $\theta_1$ while the sensor supplies torque signals.

11. Power steering according to claim 1, wherein the boost level decreases along a set slope $\theta_2$ for steering wheel release, when the sensor stops emitting torque signals.

12. Power steering according to claim 11, wherein the boost level decreases along a set slope $\theta_3$ that is smaller than the slope for steering wheel release $\theta_2$, when the vehicle exceeds the speed limit during steering.

13. Power steering according to claim 12, wherein the decrease continues along slope $\theta_3$ until the boost torque disappears, as long as the sensor emits torque signals.

14. Power steering according to claim 12, wherein the decrease of the boost level continues along slope $\theta_2$ for steering wheel release when the sensor stops emitting torque signals after the vehicle has exceeded the speed limit.

15. Power steering according to claim 1, wherein the electronic control circuit comprises a control unit of relays $R_1$ and $R_2$, receiving the signals of a torque sensor, a zero motor current signal, a clutch control unit, an integrator receiving the signals of the torque sensor, a shaped speed signal and motor safety signal and an element for measuring a motor current.

16. Power steering according to claim 15, wherein the electronic control circuit comprises an analog-to-digital converter transforming an analog signal provided by the integrator to a square-wave voltage of variable cyclic ratio, a shaping unit of the speed signal of the vehicle and a dual current comparator.

17. Power steering according to claim 16, wherein the electronic control circuit of the motor comprises two relays $R_1$, $R_2$ and a power semiconductor in pulse width, modulating a square-wave voltage, of variable cyclic ratio, of the supply voltage of the motor.

18. Power steering according to claim 15, wherein the element for measuring the motor current delivers a signal which is compared in a two-level unit to generate zero current data and supercurrent data.

19. Power steering according to claim 15, wherein the electronic control circuit of the motor comprises a protective system of the motor assuring the cutoff of the supply of the motor in the face of a supercurrent signal, and the restoration of the boost when it detects the reversal of direction of the steering wheel torque, relative to that which caused the supercurrent.

* * * * *